US009440560B2

(12) United States Patent
Neese et al.

(10) Patent No.: US 9,440,560 B2
(45) Date of Patent: *Sep. 13, 2016

(54) LOUNGE ASSEMBLY

(71) Applicant: Grady-White Boats, Inc., Greenville, NC (US)

(72) Inventors: David A. Neese, Greenville, NC (US); Mark Edward Doggett, Greenville, NC (US); Paul Durant Gallup, Greenville, NC (US)

(73) Assignee: Grady-White Boats, Inc., Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,297

(22) Filed: Mar. 16, 2016

(65) Prior Publication Data

US 2016/0198858 A1     Jul. 14, 2016

Related U.S. Application Data

(63) Continuation of application No. 14/467,772, filed on Aug. 25, 2014, now Pat. No. 9,315,238.

(60) Provisional application No. 61/877,591, filed on Sep. 13, 2013.

(51) Int. Cl.
*B60N 2/22* (2006.01)
*B60N 2/00* (2006.01)
*B60N 2/20* (2006.01)
*B63B 29/04* (2006.01)

(52) U.S. Cl.
CPC .................. *B60N 2/22* (2013.01); *B60N 2/203* (2013.01); *B63B 2029/043* (2013.01)

(58) Field of Classification Search
CPC .......... A47C 1/023; A47C 3/00; A47C 7/40; A47C 13/00; A47C 1/024; A47C 7/62; A47C 11/00; B60N 2/203; B60N 2/22; B63B 17/00; B63B 29/04; B63B 2029/043
USPC ....... 297/1, 94, 97, 188.13, 376, 383, 283.3, 297/354.12
See application file for complete search history.

(56) References Cited

U.S. PATENT DOCUMENTS

| 613,422 | A | * | 11/1898 | Pickles | .............. B61D 33/0028 297/103 |
|---|---|---|---|---|---|
| 645,609 | A | | 3/1900 | Schellenbach | |
| 684,747 | A | * | 10/1901 | Cole | ...................... B60N 2/203 297/94 |
| 1,302,397 | A | | 4/1919 | McEwan | |
| 1,429,368 | A | | 9/1922 | Owler et al. | |
| 2,007,471 | A | | 7/1935 | Landgrebe | |
| 2,383,178 | A | | 8/1945 | Edwards | |
| 2,992,044 | A | | 7/1961 | Johnson | |
| 4,085,962 | A | | 4/1978 | Wahls | |

(Continued)

FOREIGN PATENT DOCUMENTS

FR     EP 0408407 A1 *   1/1991   ............. B60N 2/203

*Primary Examiner* — Milton Nelson, Jr.
(74) *Attorney, Agent, or Firm* — Olive and Olive, P.A.

(57) ABSTRACT

A lounge assembly includes a movable backrest to be positioned at multiple locations on its seating surface. The backrest is supported by plate supports extending into the seat below its seating surface to connect to a slidable carriage assembly used to move the backrest. The backrest can be locked into selected positions on the lounge assembly seating surface. The lounge assembly is especially adapted for a boat.

18 Claims, 10 Drawing Sheets

(56) References Cited

U.S. PATENT DOCUMENTS

| | | |
|---|---|---|
| 4,470,629 A | 9/1984 | Collins, Jr. |
| 4,555,135 A | 11/1985 | Freeland |
| 4,756,573 A | 7/1988 | Simin et al. |
| 5,121,964 A | 6/1992 | Fourrey et al. |
| 5,322,341 A | 6/1994 | Harrison et al. |
| 5,335,963 A | 8/1994 | Muller et al. |
| 5,409,293 A | 4/1995 | Nagasaka |
| 5,524,962 A | 6/1996 | Fulgenzi et al. |
| 5,718,479 A | 2/1998 | Rautenbach |
| 5,722,724 A | 3/1998 | Takei et al. |
| 5,913,571 A | 6/1999 | Dystra et al. |
| 6,082,805 A | 7/2000 | Gray et al. |
| 6,199,945 B1 | 3/2001 | Kim |
| 6,257,667 B1 | 7/2001 | Boren et al. |
| 6,651,274 B2 | 11/2003 | Swihart et al. |
| 6,715,825 B2 | 4/2004 | Tame |
| 7,134,727 B2 | 11/2006 | Williams |
| 7,252,337 B2 | 8/2007 | Hofmann et al. |
| 7,341,306 B1 | 3/2008 | Neese et al. |
| 7,513,211 B1 | 4/2009 | Farb et al. |
| 7,644,982 B2 | 1/2010 | Paluch |
| 7,661,382 B2 | 2/2010 | Wood et al. |
| 7,775,599 B2 | 8/2010 | George et al. |
| 8,313,059 B2 | 11/2012 | Ferry et al. |
| 8,517,466 B1 | 8/2013 | Wizorek et al. |
| 2005/0253433 A1* | 11/2005 | Brown .................. B60N 2/06 297/283.3 |
| 2008/0088160 A1 | 4/2008 | Johnson |
| 2011/0049956 A1 | 3/2011 | Spivey et al. |

\* cited by examiner

LOUNGE ASSEMBLY

CROSS REFERENCE TO RELATED APPLICATIONS

This application is a continuation of application Ser. No. 14/467,772, and is related to and claims priority to application Ser. No. 14/467,772, filed Aug. 25, 2014 and to Provisional Application No. 61/877,991, entitled Lounge Assembly, and filed Sep. 13, 2013. The disclosure of Provisional Application No. 61/877,991 is expressly incorporated in its entirety by reference herein.

FIELD OF THE INVENTION

This invention relates to a lounge assembly with a movable backrest allowing multiple seating configurations. In an embodiment, the seat is a lounge assembly for about.

BACKGROUND

In the boating industry it is desirable to provide multiple seating arrangements, typically as lounges, for passengers on boats to allow such passengers to select a particular view. For example, some passengers may want to face aft to view water activities such as skiing from the boat. Other passengers may want to face forward to view, for example, children in a bow portion of the boat. Still further it may also be desirable to provide a seat arrangement capable of accommodating multiple passengers.

In a boating environment it is important that seating arrangements be easily converted from one position to the next with little occupying of additional space or use of complex mechanisms. Unfortunately, most adjustable seating arrangements involve complex mechanisms, are difficult to operate, and/or are space consuming. For example, often heavy seats must be lifted and moved. Further, many existing adjustment mechanisms involve hinges that can present safety hazards to fingers during adjustment. Such hazards are particularly undesirable when boats are in motion or when small children are present.

Examples of patents for seating arrangements having adjustable backrests exemplifying some of the disadvantages of the prior art are: U.S. Pat. No. 7,775,599; U.S. Pat. Nos. 6,715,825; 7,644,892; U.S. Pat. No. 6,082,805; and U.S. Pat. No. 6,651,274.

In accordance with the inventions described herein, an easily configurable lounge assembly with a movable backrest is provided with a simple to use adjustment mechanism allowing multiple seating configurations, for example, for use on a boat.

BRIEF SUMMARY

In accordance with an embodiment of the invention, a lounge assembly has a stationary base and a movable backrest to achieve multiple seating positions. This embodiment of the lounge assembly allows a center position for the backrest to provide back to back sea for two people, one facing forward and the other facing aft. The backrest is also slidable and can be locked in extreme forward or aft positions to provide a lounging configuration for passengers in a forward or aft facing position as well as in the center position for two people sitting back to back. The backrest is also tiltable from an upright configuration to a reclining position through adjustable backrest detents in a structural support for the backrest.

The lounge assembly can be made of different dimensions. For example, a seating surface thereof can be made sufficiently long so that when the backrest is at either the aft position or forward-roost position, the assembly can function as a lounge, as described above. In a shorter configuration, the assembly could function alternatively as seating for two people when the backrest is centered or for a single adult when the backrest is at either the aft or forward-most positions.

An internal rail system in the seat base of the depicted embodiment is provided to allow the backrest to slide forward and backward. A locking mechanism is used to releasably lock the backrest desired position.

BRIEF DESCRIPTION OF THE DRAWINGS

Having briefly described embodiments of the invention, the same will become better understood from the detailed description, made with reference to the drawings wherein.

DETAILED DESCRIPTION OF EMBODIMENTS OF THE INVENTION

Figure 1:
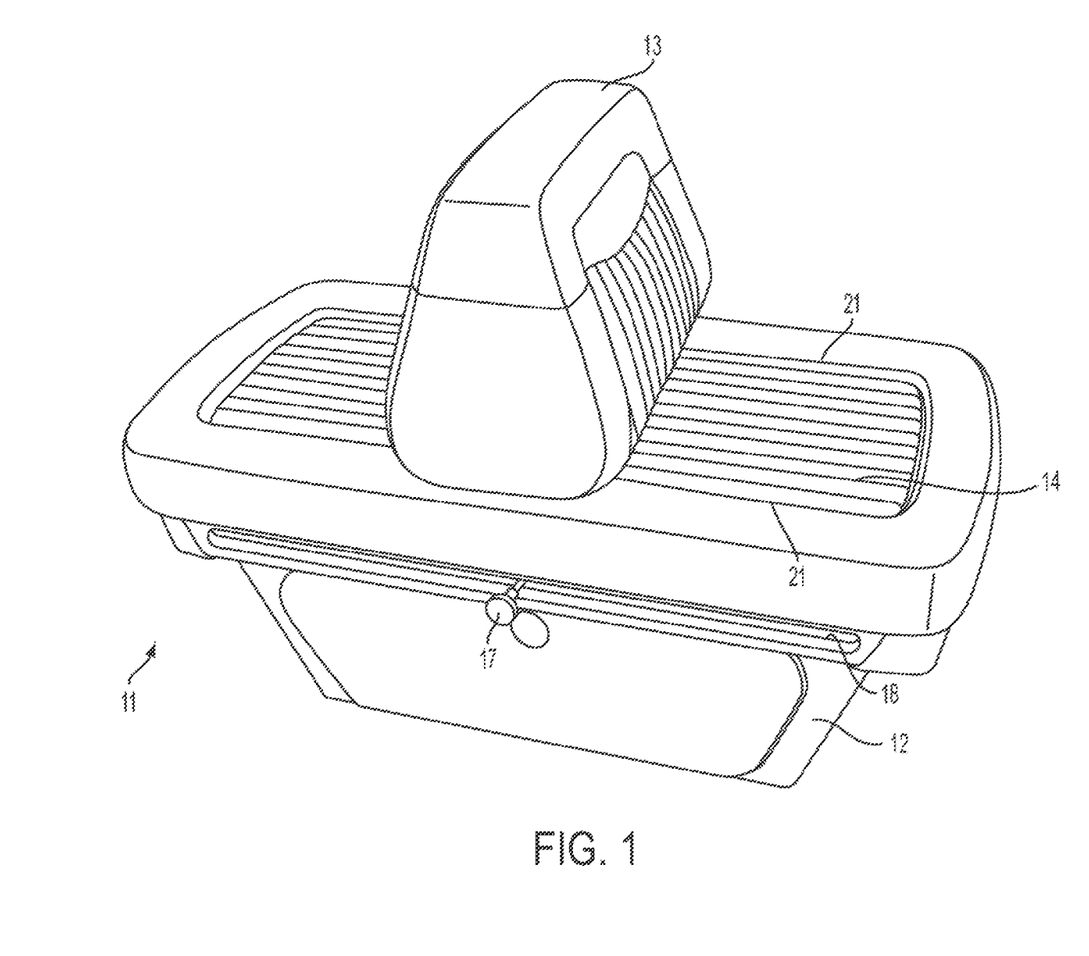
FIG. 1 is a perspective view from one side of an embodiment of a lounge assembly with a backrest in center position, and showing a handle for moving the backrest and a hinged side door allowing access to storage in a seat base.

FIG. 1 shows in perspective view a lounge assembly 11, which includes a seating surface 14 along which a backrest 13, shown in a center upright position, can be moved according to an embodiment of the invention. The backrest 13 of this embodiment is supported by two relatively thin plate supports 15 (not shown in FIGS. 1-6) extending upward from a base of the lounge assembly 11 described and shown hereafter with reference to FIGS. 7, 8, 10, 11, and 13. The design of the supports has been selected for cosmetic purposes and it will be obvious to persons skilled in the art that supports of varying design and thickness can be utilized.

The seating surface 14 has a central cushioned section as shown in FIGS. 1-6. The plate supports penetrate into the lounge base 12, through the seating surface 14, through seating surface slots 21 running the length of the seat surface 14 at the outermost two central cushioned portions of the seating surface 14. The pleats in this depicted embodiment are decorative in nature and allow for the slots 21 for plate supports 15 (FIGS. 7, 8, 10, 11, 13) to not be as visible as compared to a non-pleated surface. The plate supports 15 penetrate into the lounge base 12 and are connected to a carriage assembly 19 (not shown in FIGS. 1-6) within the lounge base 12.

A handle 17 connected to a carriage assembly (which includes a locking mechanism) is shown projecting from a side slot 18 in the lounge base 12. The carriage assembly (not shown) supports and allows movement of the backrest 13 to allow a user to use the handle 17 to manually slide the backrest 13 along the seating surface 14. A hinged door 20 that leads to a storage area in the seat base 12 is also shown. As shown in FIGS. 1-6, the lounge assembly 11 is cushioned at the seating surface 14 and at the backrest 13. These cushioned areas are not shown in FIGS. 7-15 to facilitate illustration and understanding of operation of the lounge assembly.

Figure 2:
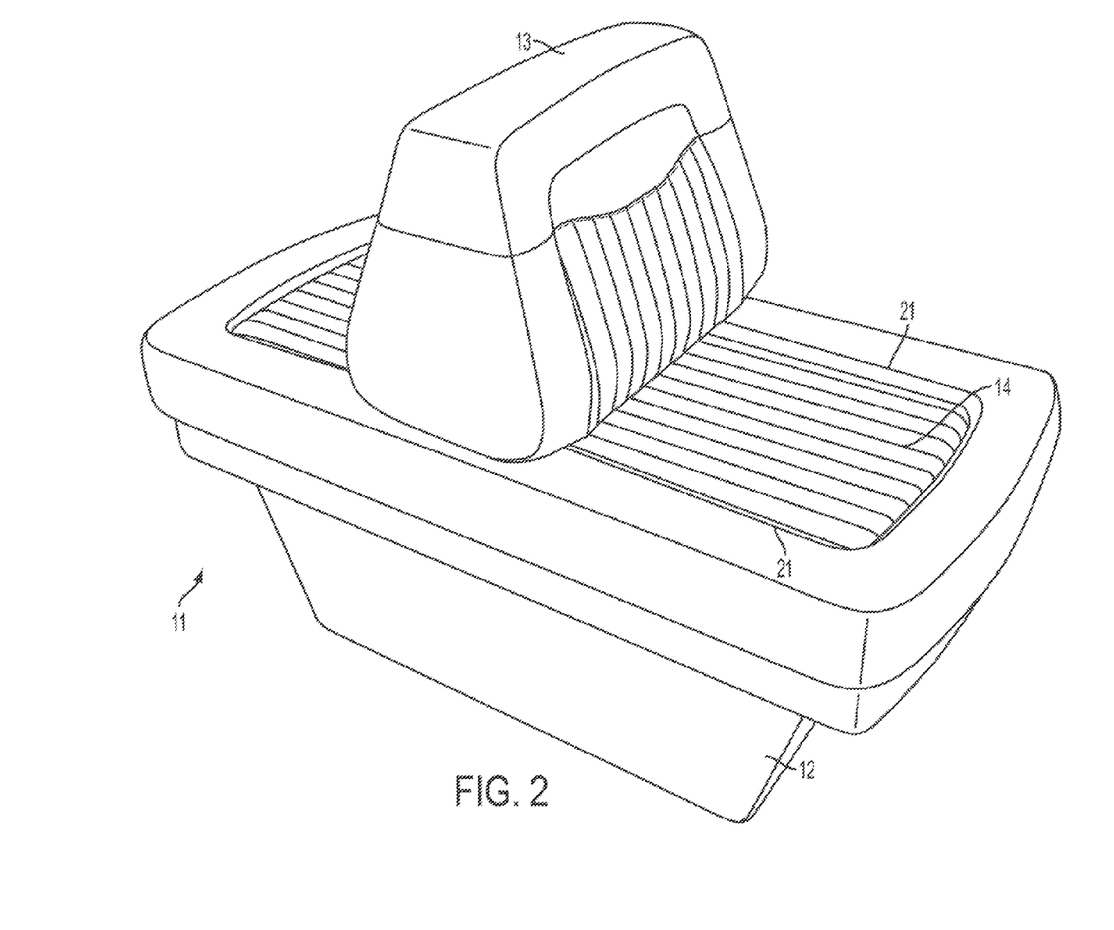
FIG. 2 is a view as in FIG. 1 of the other side of the lounge assembly.
Figure 3:
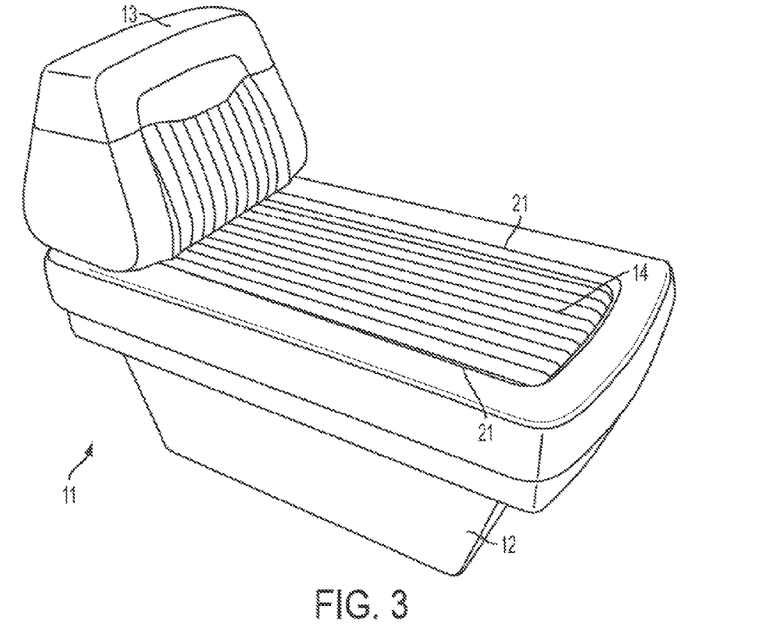
FIG. 3 is a perspective view showing the backrest upright in aftmost position.
Figure 4:
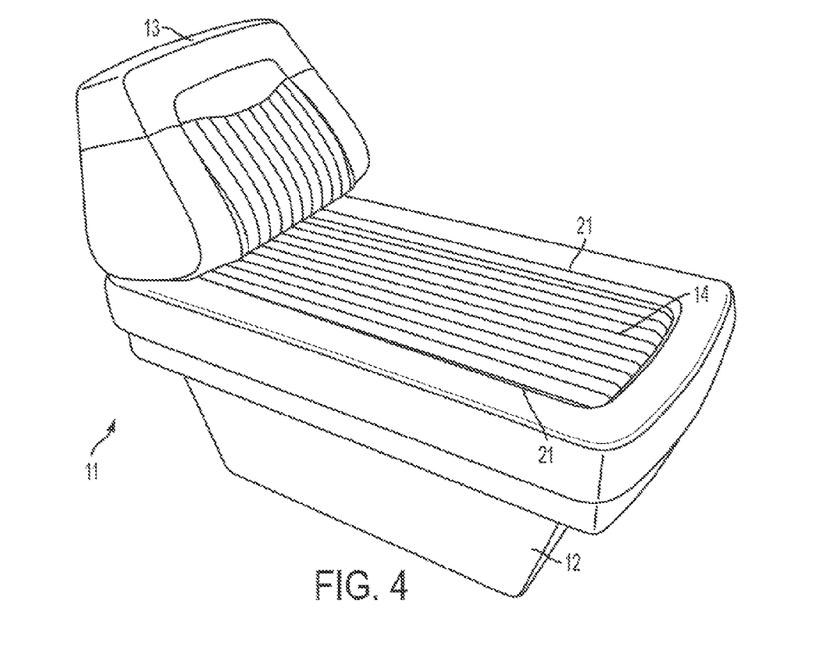
FIG. 4 is a perspective view showing the backrest reclined in aftmost position.
Figure 5:
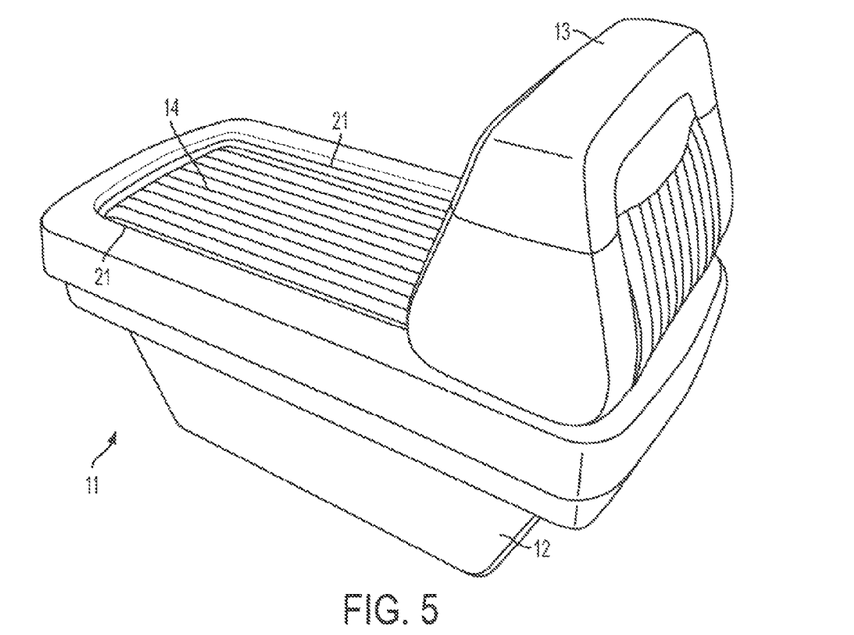
FIG. 5 is a perspective view of the backrest upright in forwardmost position.
Figure 6:
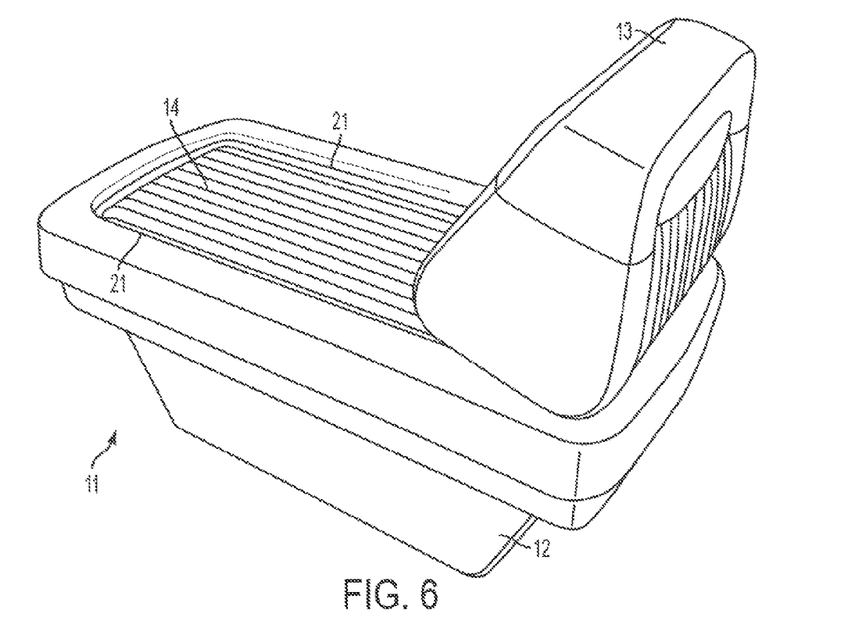
FIG. 6 is a perspective view of the backrest reclined in forwardmost position.

By way of further explanation, FIG. 2 shows the lounge assembly of FIG. 1 from the other side, which has no handle 17 or door 20. HIM 3 and 4 show the lounge assembly backrest of the FIG. 1 embodiment in aftmost positions in upright and reclined position, respectively. FIGS. 5 and 6 show the same backrest in forwardmost position in upright and reclined position, respectively.

Figures 7, 8:
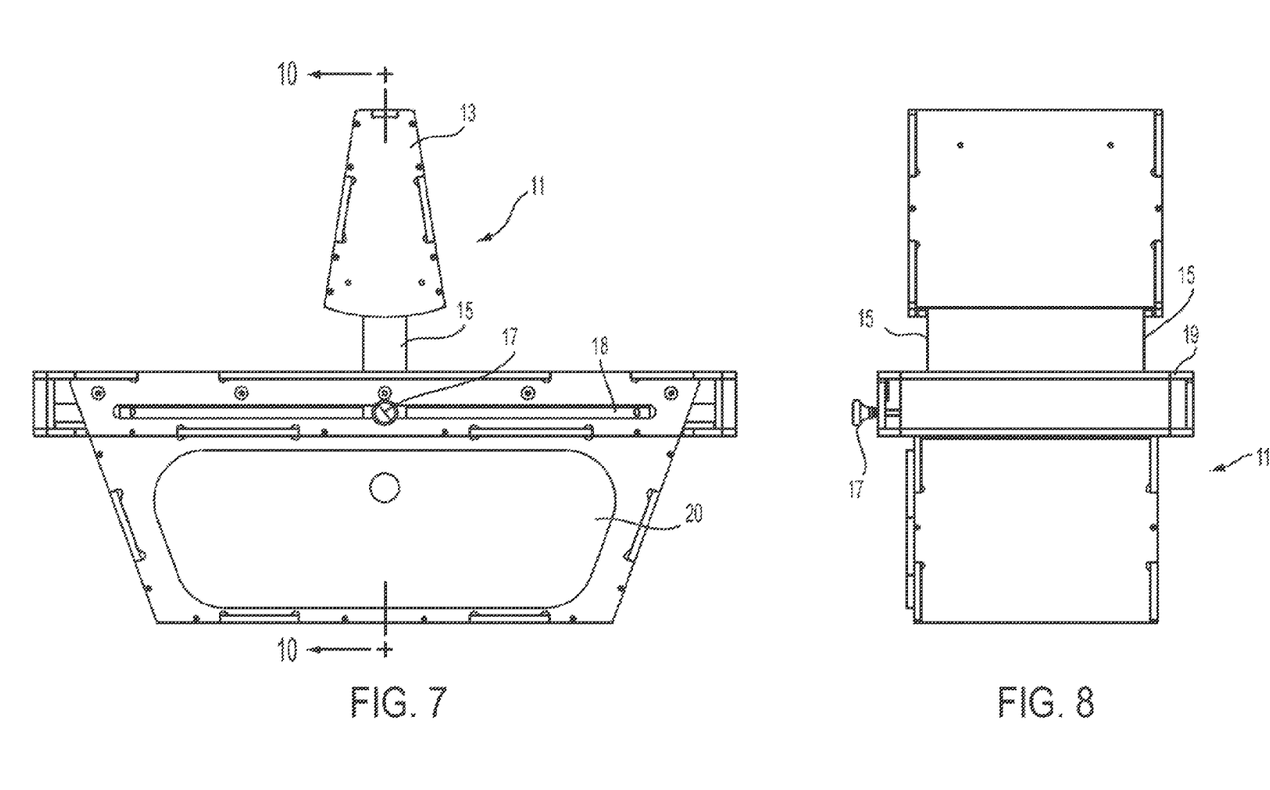
FIG. 7 is a side view of the lounge assembly without cushioned surface showing a backrest support for the lounge assembly, and showing a side storage door and a latch locking mechanism in a slot to allow movement of the backrest.
FIG. 8 is an end view of the lounge assembly of FIG. 7 showing a carriage assembly for the backrest.

FIG. 7 is a side view of a lounge assembly 11 according to an embodiment of the invention having a backrest support 13 attached to the plate supports 15 (only one shown). The plate supports 15 project into the seat's base 12 through seat surface slots 21 to be carried on a carriage assembly 19. Cushioning for the backrest and the seating surface is not shown. A handle 17 connected to the carriage assembly 19 is also shown, as is the door 20 leading to a storage compartment.

FIG. 8 shows the carriage assembly 19 of an embodiment of the invention, to which the plate supports 15 are connected at each side thereof. The carriage assembly 19 is positioned beneath the lounge assembly seating surface 14 (FIGS. 1-6).

Figure 9:
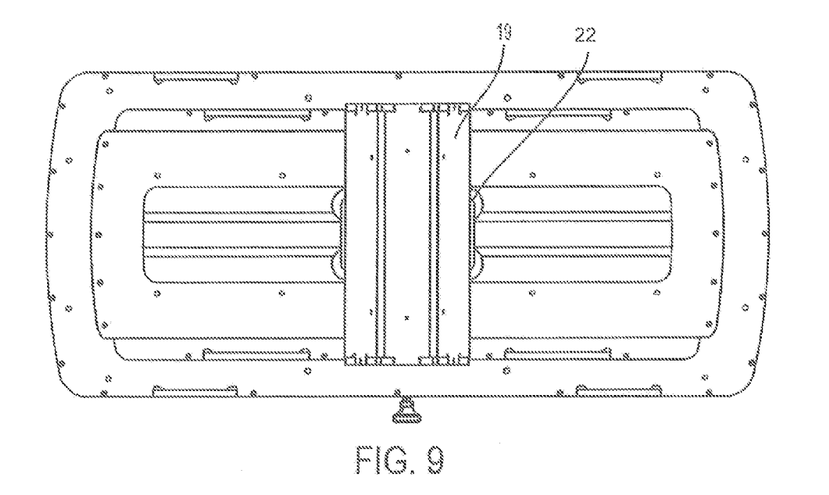
FIG. 9 is a top partial cross section view of the lounge assembly showing a carriage assembly with wheels engaging a rail.
Figure 10:
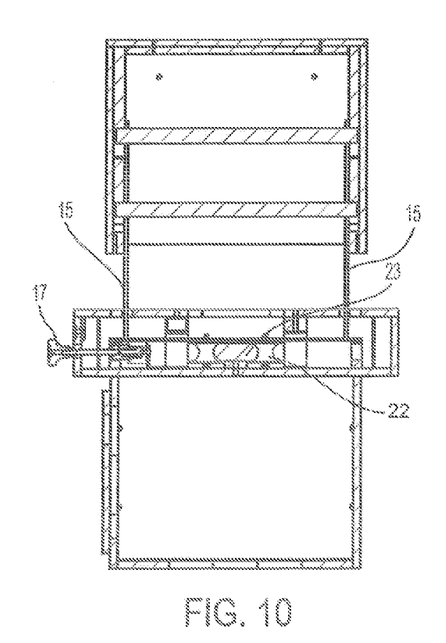
FIG. 10 is an end partial cross-section view showing a backrest carriage assembly, handle assembly and wheel and rail system.
Figure 12:
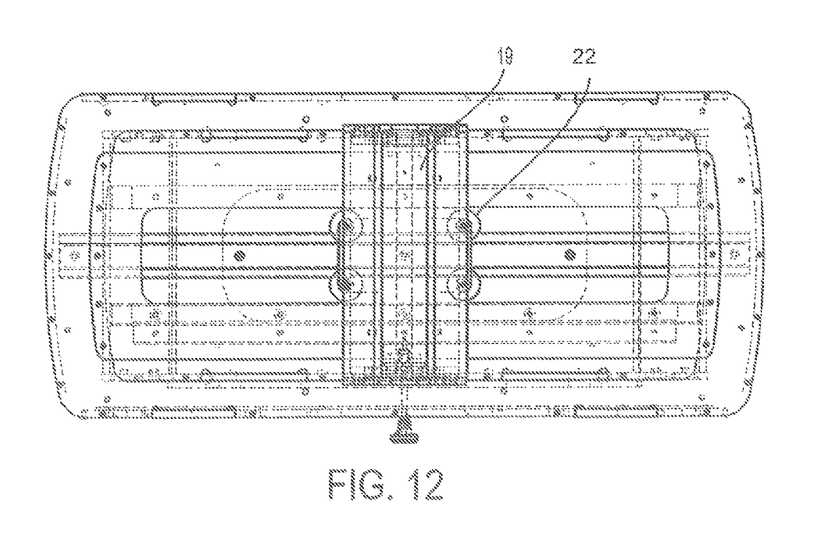
FIG. 12 is a view as in FIG. 9, showing in partial cross-section greater details about the rail, wheels and the carriage assembly.
Figure 13:
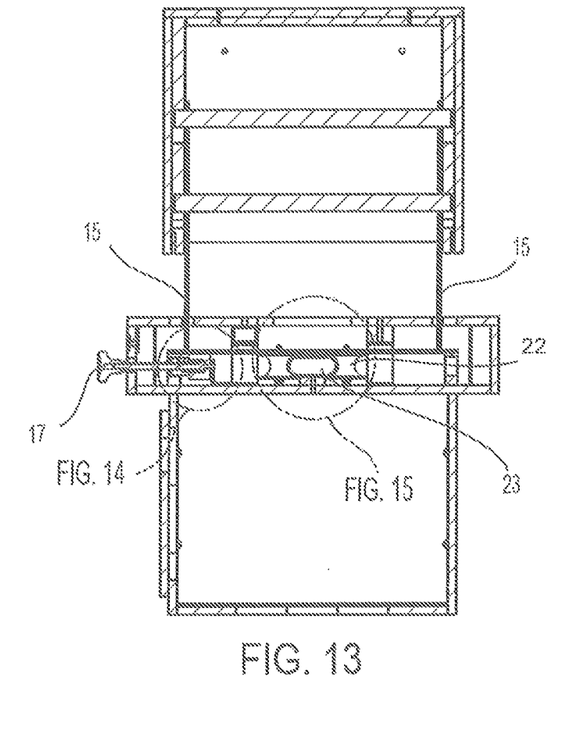
FIG. 13 is a view as in FIG. 10 showing in partial cross-section in greater detail the rail and wheel assembly and the carriage assembly.

FIGS. 9 and 12 show in greater detail the carriage assembly 19 of FIG. 8 supported on wheels 21 which roll on a rail 23 within the lounge assembly 11. The rail 23 is shown in greater detail in FIGS. 10, 13, and 15 in engagement with wheels 21. The handle 17 is connected to a locking mechanism (FIG. 14) and can be used to cause the carriage assembly 19 to move by pulling on it, thus moving the backrest 13 into a desired position and then locking the backrest 13 in place. The handle locking mechanism includes a spring loaded lock 51 which engages a locking opening 31 for a desired backrest 13 position, as shown in FIG. 14.

Figure 11:
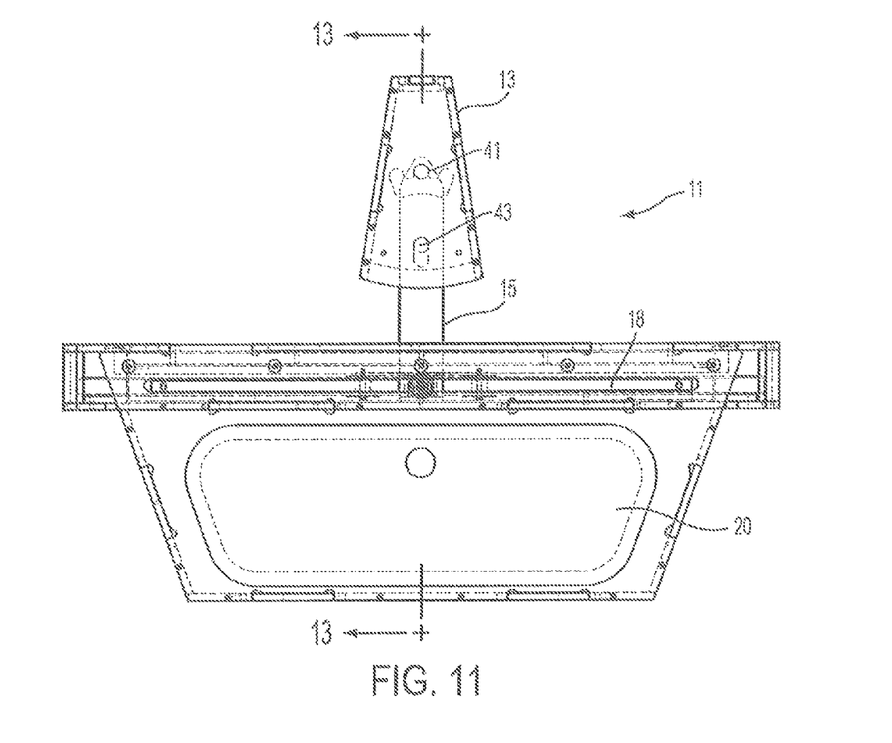
FIG. 11 is a view as in FIG. 7 showing in partial cross-section an adjustable backrest detent mechanism to allow the backrest to be tilted between upright and reclined positions, and locked in position.

FIG. 11 shows the backrest plate supports 15 (one shown) of an embodiment of the invention with detent mechanisms 41 and 43 which allow the backrest 13 to be moved between upright and reclined positions, and locked in place in the position desired.

Figure 14:
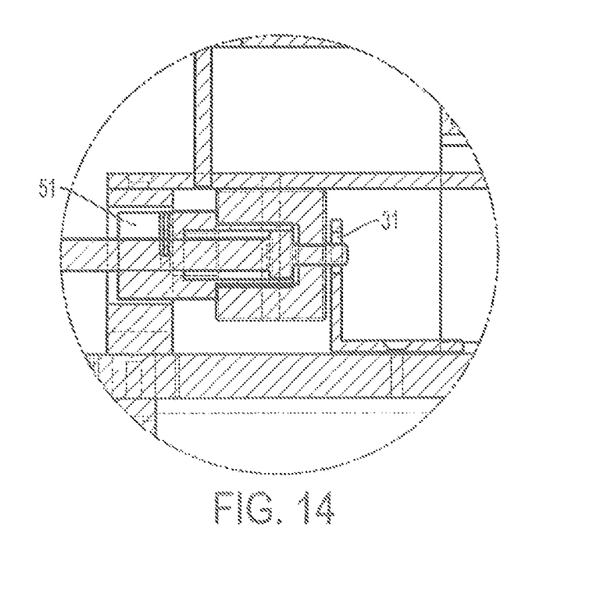
FIG. 14 is an enlarged partial cross-section side view of a locking mechanism associated with the handle and the carriage assembly.

Greater details about the locking mechanism of the handle 17 are shown in FIG. 14. The handle 17 is connected to the carriage assembly 19 and locks in place with a spring loaded lock 51. The locking mechanism of the handle assembly 17 can through spring loaded engagement have an end thereof enter one of several selected openings 31 in a panel in the slot 18 where the handle assembly 17 is located to lock the backrest 13 in a desired position.

While in one embodiment there are three locking positions, for example, with three openings for the locking mechanism of the handle assembly 17, it will be appreciated that the number of openings for the locking mechanism of the handle assembly 17 can vary depending on the number of locking positions desired for the backrest 13.

Figure 15:
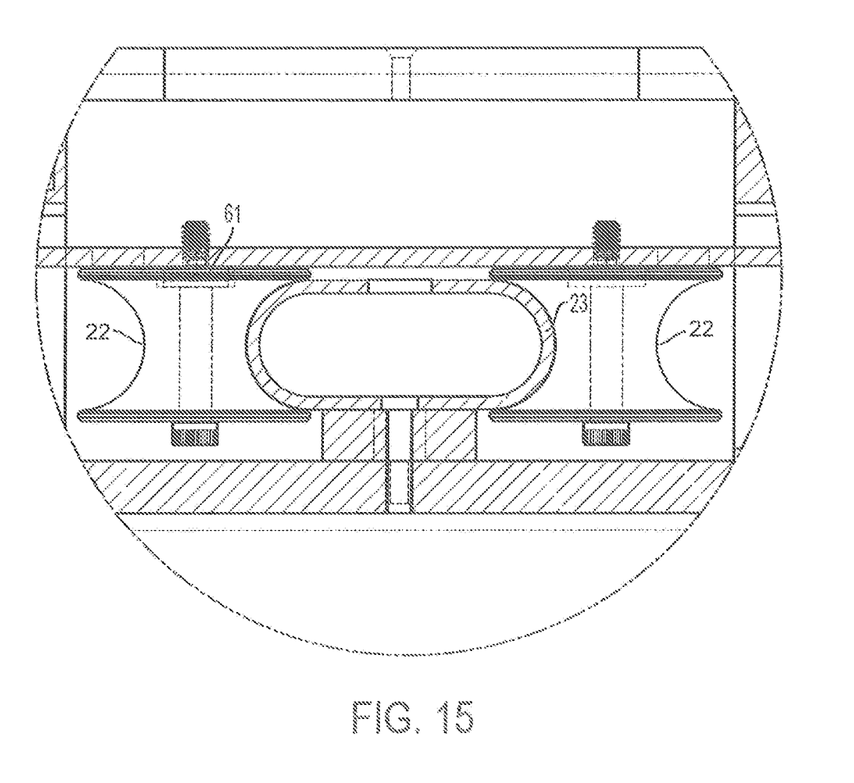
FIG. 15 shows, in enlarged partial cross-section, a view of the rail and wheels associated with the carriage assembly.

As previously noted, FIG. 15 shows the rail 23 in enlarged view. The rail 23 is engaged by carrier wheels 21 which are secured to carriage assembly 19 through thrust bearings 61.

Figure 16:
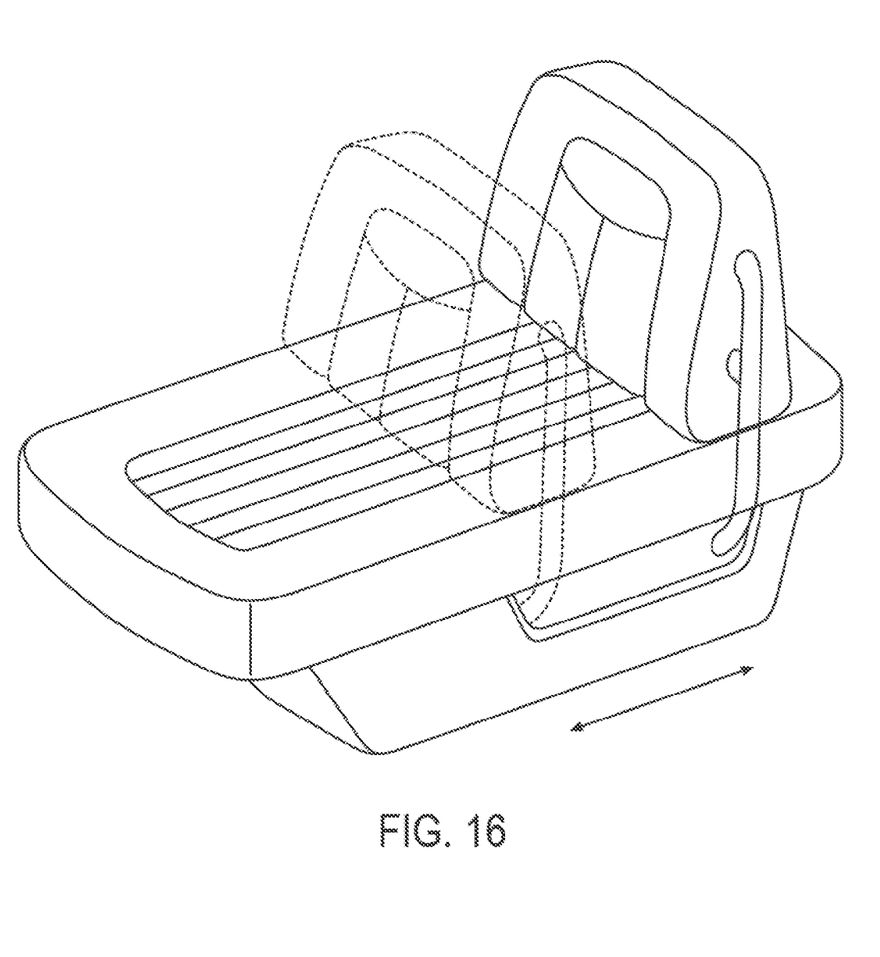
FIG. 16 is a perspective view of an alternate embodiment of the invention.

FIG. 16 illustrates an alternate embodiment of a lounge assembly where a handle is attached to a backrest and the backrest moves only between two positions, here illustrated as center and to one end only. In this embodiment it is contemplated that a carriage assembly with support plates similar to those in the prior described embodiment may be used to move the backrest. It is further contemplated that a motor may optionally be connected to the carriage assembly to allow for powered movement.

The foregoing details and embodiments are exemplary only. Other modifications that might be contemplated by those of ordinary skill in the art are within the scope of this invention, and are not limited by the examples illustrated herein.

The invention will become better understood from the appended claims in which it is set forth in a non-limiting manner.

What is claimed is:

1. A lounge assembly, comprising:
   a. a seating surface having a length and a width and being fixed in position to a base;
   b. a carriage assembly positioned beneath the seating surface within the base;
   c. a moveable backrest positioned above the seating surface, said moveable backrest affixed to the carriage assembly; and
   d. said moveable backrest and carriage assembly being slideable along the length of the seating surface and having at least three stop locations at predetermined backrest positions, a first backrest position near a first end of the length of the seating surface, a second backrest position near a second end of the length of the seating surface, and a central backrest position at a point between the first and second backrest positions, said carriage assembly located below the seating surface within the base and further comprising plate members extending from the carriage assembly through slots into the seating surface into the backrest, and having said backrest connected to the plate members, and said carriage assembly within the base below the seating surface thereof configured for allowing the backrest to be moved to different positions on said seating surface whereby the lounge assembly is adapted for having the first backrest position defining a substantially horizontal lounge facing in a first direction and in the second backrest position defining a substantially horizontal lounge facing in a second direction, opposite to the first direction, and in the central backrest position defining in a back-to-back relation respective oppositely first and second direction facing seats.

2. The lounge assembly of claim 1, further comprising a storage compartment located in the base.

3. The lounge assembly of claim 1, wherein said carriage assembly further comprises wheels for engaging a rail within the base below the seat thereof, and the base further comprises a rail extending the length thereof for engagement with said wheels to allow the backrest to be moved to different positions of said seating surface.

4. The lounge assembly of claim 1, wherein said lounge assembly comprises a boat lounge.

5. The lounge assembly of claim 1, wherein the carriage assembly further comprises a handle assembly adapted for repositionably locking the carriage assembly in place at the predetermined backrest positions.

6. The lounge assembly of claim 5, wherein said base has a slot running the length thereof below the seating surface, and said handle assembly has a handle, and is connected to the carriage assembly and extends from the slot to allow moving of the backrest by a user holding the handle.

7. The lounge assembly of claim 6, wherein the handle includes a locking mechanism for locking the backrest into said predetermined backrest positions along the seating surface.

8. The lounge assembly of claim 1, wherein the backrest is adjustable to tilt from an upright position to at least one reclined position.

9. The lounge assembly of claim 8, wherein the backrest is adjustable in at least three positions, a first position being substantially upright, a second position being reclined towards the first end of the length of the seating surface, and a third position being reclined towards the second end of the length of the seating surface.

10. The lounge assembly of claim 8, further comprising a tilt and detent mechanism for allowing the backrest to be moved between said upright and reclined positions, and for locking the backrest into one of said upright and reclined position.

11. A lounge assembly, comprising:
 a. a seating surface having a length and a width and being fixed in position to a base;
 b. a carriage assembly positioned beneath the seating surface within the base;
 c. a moveable backrest positioned above the seating surface, said moveable backrest affixed to the carriage assembly; and
 d. said moveable backrest and said carriage assembly being slideable along the length of the seating surface and having at least three stop locations at predetermined backrest positions, a first backrest position near a first end of the length of the seating surface, a second backrest position near a second end of the length of the seating surface, and a central backrest position at a point between the first and second backrest positions, said carriage assembly comprising plate members extending from the carriage assembly through slots in the seating surface into the backrest, and having said backrest connected to the plate members, and said carriage assembly further comprising wheels engaging a rail extending the length of the base, and within the base below the seating surface to allow the backrest to be moved to different positions on said seating surface whereby the lounge assembly is adapted for having the first backrest position defining a substantially horizontal lounge facing in a first direction and in the second backrest position defining a substantially horizontal lounge facing in a second direction, opposite to the first direction, and in the central backrest position defining in a back-to-back relation respective oppositely first and second direction facing seats.

12. The lounge assembly of claim 11, further comprising a storage compartment located in the base.

13. The lounge assembly of claim 11, wherein said lounge assembly comprises a boat lounge.

14. The lounge assembly of claim 11, where in the backrest is adjustable to tilt from an upright position to at least one reclined position.

15. The lounge assembly of claim 14, wherein the backrest is adjustable in at least three positions, a first position being substantially upright, a second position being reclined towards the first end of the length of the seating surface, and a third position being reclined towards the second end of the length of the seating surface.

16. The lounge assembly of claim 11, wherein the carriage assembly further comprises a handle assembly adapted for repositionably locking the carriage assembly in place at the different backrest positions on said seating surface.

17. The lounge assembly of claim 16, wherein said base has a slot running the length thereof below the seating surface, and said handle assembly has a handle, and is connected to the carriage assembly and extends from the slot to allow moving of the backrest by a user holding the handle.

18. The lounge assembly of claim 17, wherein the handle includes a locking mechanism for locking the backrest into said predetermined backrest positions along the seating surface.

\* \* \* \* \*